United States Patent
Olofsson et al.

[11] Patent Number: 5,987,898
[45] Date of Patent: Nov. 23, 1999

[54] PELLET FREEZING

[75] Inventors: Mats Olofsson, Hjrnarp; Bo Andersson, Oxie, both of Sweden

[73] Assignee: Nestec S.A., Vevey, Switzerland

[21] Appl. No.: 08/939,728

[22] Filed: Oct. 3, 1997

[30] Foreign Application Priority Data

Oct. 8, 1996 [EP] European Pat. Off. ............. 96202790

[51] Int. Cl.[6] .................................................. F25D 13/06
[52] U.S. Cl. ..................... 62/63; 62/66; 62/74; 62/340; 426/524; 426/589
[58] Field of Search .................................. 62/63, 66, 74, 62/340; 426/524, 589

[56] References Cited

U.S. PATENT DOCUMENTS

| | | | |
|---|---|---|---|
| 4,655,047 | 4/1987 | Temple et al. | 62/74 |
| 4,748,029 | 5/1988 | Alfred et al. | 426/231 |
| 4,761,962 | 8/1988 | Andersson | 62/63 |
| 4,906,486 | 3/1990 | Young | 426/518 |
| 4,929,456 | 5/1990 | Bejarano-Wallens et al. | 427/99 |
| 4,934,928 | 6/1990 | Akamatsu | 432/59 |
| 5,257,510 | 11/1993 | Cox | 62/346 |
| 5,661,981 | 9/1997 | Laux et al. | 62/74 |

FOREIGN PATENT DOCUMENTS

| | | |
|---|---|---|
| 0 332 287 A1 | 9/1989 | European Pat. Off. . |
| 58 190348 | 11/1983 | Japan . |
| 1016574 | 1/1966 | United Kingdom . |

*Primary Examiner*—Ronald Capossela
*Attorney, Agent, or Firm*—Pennie & Edmonds LLP

[57] ABSTRACT

The present invention relates to extruded frozen pellets of sauce and a method for freezing pellets of sauce. This method includes dosing a layer of sauce onto a refrigerated surface, partially freezing the sauce on the surface to cause a generation of ice crystals and an increase in the viscosity of the unfrozen sauce, removing the partially frozen sauce from the surface, mixing the frozen and unfrozen sauce to form a shapeable sauce, forming the shapeable sauce into pellets, and freezing the pellets. The invention also relates to a method wherein the sauce is fully frozen in a thin layer and subsequently mixed with unfrozen sauce to form the shapeable sauce.

22 Claims, 1 Drawing Sheet

PELLET FREEZING

TECHNICAL FIELD

The present invention relates to a method of freezing pellets or portions of sauce, in particular to a method which is advantageous for the freezing of pellets or portions of sauces which include starch. The invention also relates to the frozen sauce pellets or portions provided by the method.

BACKGROUND ART

Frozen sauce is typically used in frozen ready meals or in catering services. Conventionally, the sauce is either dosed directly onto the meal and frozen together with it, or frozen into blocks separately. Frozen sauce may also be prepared in pellet form which is then used in meals made of individual frozen cubes of meat and vegetables. Such meals are usually prepared by pan-frying.

The prior art sauce pellets or portions are frozen in molds or by dosing droplets of sauce onto a very cold, i.e., below freezing temperature, surfaces. When freezing pellets in molds, substantial work is involved in filling, emptying and cleaning the molds. Freezing of sauce pellets by dosing onto a frozen surface results in flat and irregular pellet shapes.

When providing a frozen sauce it is important that once the sauce is thawed, it remains substantially unchanged compared to unfrozen sauce. For example, the viscosity of the sauce should not substantially change. The amount of starch in the sauce is determining for the viscosity of the sauce. If the sauce is subjected to too severe mechanical contact, the starch molecules will be damaged.

It is known to freeze liquid food products in ice-cream freezers, a process which is used in sorbet and ice-cream production. Ice-cream freezers are freezers that have cooling heat exchange surfaces with scrapers moving the food product to and from the cooling surfaces. Such freezers may not be suitable for the freezing of certain types of sauce as the freezing and scraping process can damage starch molecules in the sauce, resulting in a thawed sauce which has a lower viscosity than a similar sauce that has not gone through the ice-cream freezing process. This can require an extra step where starch must be added to the thawed sauce to increase the viscosity to desired levels.

The use of ice-cream freezers with scrapers may also be undesirable for sauces that contain particles or lumps of vegetables, meat or fish, because the scrapers provide a milling action that can produce more finely distributed particles which can result in a color change of the sauce.

It is an aim of the invention to provide a method for freezing pellets of sauce in a manner which does not substantially damage the starch molecules so that the re-heated sauce has substantially the same consistency as the sauce prior to freezing.

SUMMARY OF THE INVENTION

Accordingly, the present invention provides a method for freezing pellets of sauce by dosing a layer of sauce onto a surface, partially freezing the sauce on the surface to cause formation of ice crystals and an increase in the viscosity of the unfrozen sauce, removing the partially frozen sauce from the surface, mixing the partially frozen sauce to form a shapeable sauce, forming the shapeable sauce into pellets, and freezing the pellets.

The method according to the invention provides a gentle way of freezing sauce which has a first freezing step involving making the sauce shapeable and a second final freezing step. The sauce is dosed in a layer so that the water phase can freeze first and the solid matter in the sauce increases the viscosity of the unfrozen sauce. Upon removing the partially frozen sauce from the surface it is broken up to allow the unfrozen sauce of higher viscosity to be distributed around the frozen surfaces of the sauce. Mixing is then provided to improve the distribution of frozen and non-frozen sauce. When this is done a mixture is, obtained which surprisingly can be shaped into pellets which can then be frozen to substantially retain their shape. When thawing such pellets, a sauce is obtained which has substantially the same viscosity as the sauce which was frozen into the pellets.

BRIEF DESCRIPTION OF THE DRAWING

The present invention will now be described in further detail with reference to the accompanying drawing by way of example only.

DETAILED DESCRIPTION OF THE PREFERRED EMBODIMENTS

Figure 1:
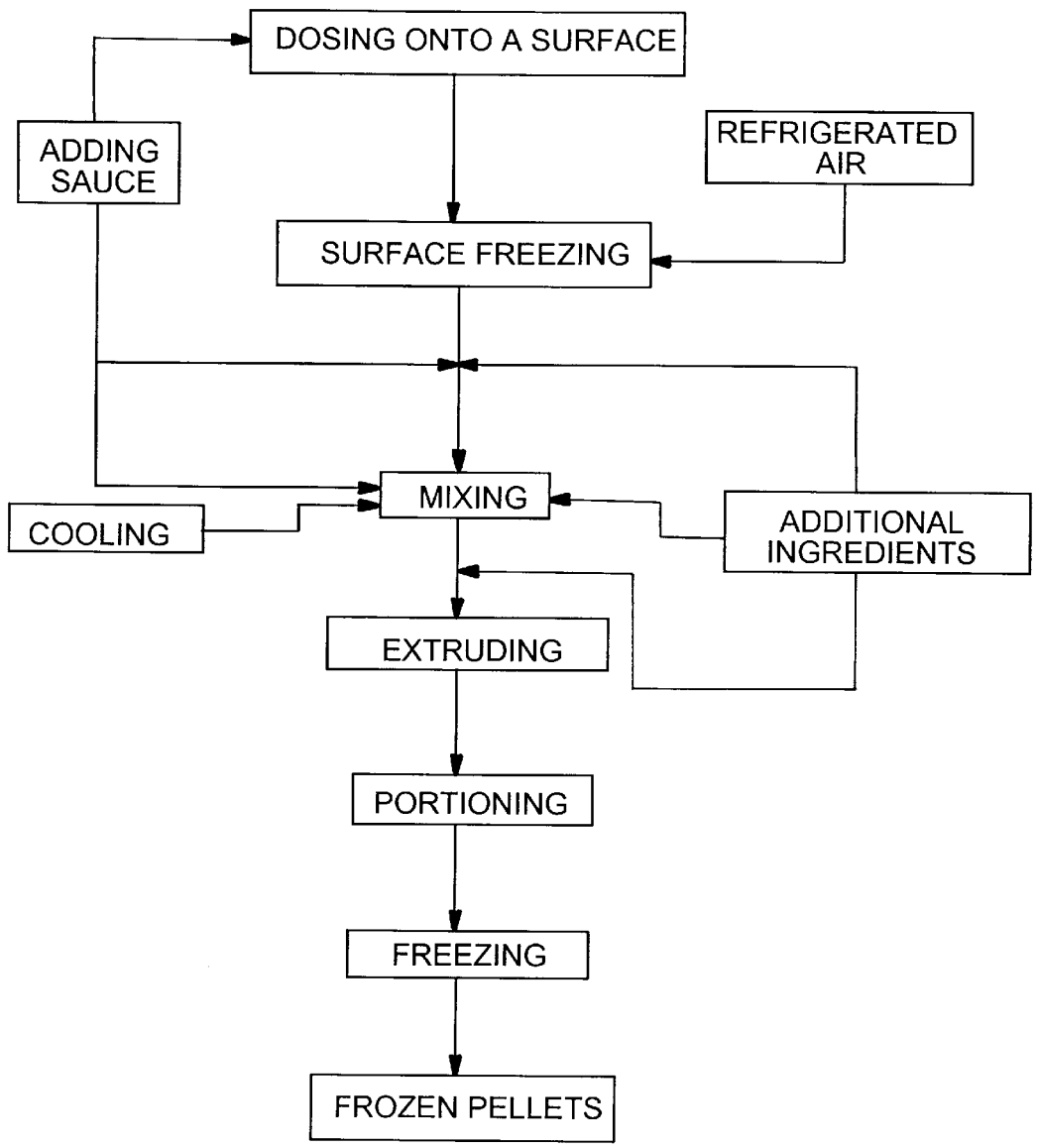
FIG. 1 is a schematic chart showing the steps of a method for freezing pellets according to the invention.

In the present context, the term pellets is intended to include pellets, portions, nuggets or blocks. The size of these pellets may vary depending on the application. A suitable size for pan-frying meals is about 3 to 8 grams. For separate preparing of sauce pellets 12 to 30 grams are used. For catering, the pellets can be in the form of 100 to 200 gram blocks.

In the present context, a sauce is a substantially non-aerated liquid food material comprising fat, water and usually starch. It may also comprise flavoring agents such as salt, sugar, spices and agents to improve color. Other ingredients may be added such as vegetables, meat or fish pieces or lumps. The viscosity of the sauce may vary from very thin water-like viscosity to a thicker sauce which is still flowable or pumpable. The viscosity of the sauce is determined substantially by the starch and fat used and content thereof.

The method may be performed by dosing of sauce into a freezer having a substantially plane horizontal freezing surface. Such freezers may be plate freezers, a steel belt freezing conveyor or a cryogenic freezer. In a preferred embodiment of the invention, a layer of sauce is dosed onto a contact freezer that is preferably covered with a plastic film which eases the removal of the film while providing a gentle breaking up of the partially frozen sauce.

It is preferred that the sauce layer dosed onto the surface is hardened on one side while the sauce in the center of the layer remains unfrozen. This can be accomplished by cooling the surface to sufficiently low temperatures so that the underside of the sauce that contacts the surface becomes frozen. Alternatively, cooling means, such as refrigerated air, may be provided for freezing of the sauce's upper surface. Advantageously, the sauce layer is crust frozen, where all outer surfaces, but not the center, are frozen.

For an adjustment of temperature and viscosity of the mixture of partially frozen sauce, i.e., the sauce which has been dosed onto the surface, additional unfrozen sauce may be added. When adding additional unfrozen sauce, it is preferable to gently mix it into the partly frozen sauce before or during the time it is mixed.

Advantageously, the thickness of the layer of sauce dosed in accordance with this embodiment of the invention is in the range of 5 to 20 mm. The sauce may conveniently be dosed on the whole width of the cooling surface or in strips, dots or other patterns.

The temperature of the surface is in the range of about −10 to −100° C., however, preferably in the range of about −20° C. to −40° C. The sauce dosed onto the freezing surface is preferably at ambient temperature although it can be chilled.

The temperature at which the sauce is shapeable will depend on the composition of the sauce, e.g., the starch, fat, and salt content. However, for most purposes, sauce is shapeable at a temperature in the range of −2° C. to −8° C., preferably from −3 to −6° C., and more preferably at about −4° C.

The forming of the shapeable sauce is preferably done by extruding the sauce through a die and subsequently portioning the extrudate into pellets.

As discussed above, mixing of the partly frozen sauce should be gentle. This may be done by an auger. During the mixing of the sauce into a shapeable sauce additional cooling may take place but this is not a requirement.

Sauces which advantageously can be frozen into pellets with a method according to the invention include cheese sauce, e.g., Béchamel sauce, tomato sauces, sauces with meat, e.g., Bolognese sauce. Ingredients may be added to the sauce preferably before or during the mixing of the sauce. They may be added after mixing but before extruding of the shapeable sauce. The ingredients may also be co-extruded with the shapeable sauce if desired.

In a preferred embodiment, the sauce is completely frozen on the surface, is removed, and unfrozen sauce is added to the frozen sauce before mixing the unfrozen and frozen sauce to form the shapeable sauce. In this embodiment of the invention the layer of sauce dosed onto the freezing surface should be thin, e.g., in the range of 2 to 5 mm. If the layer is considerably thicker, breaking and blending of the layer is inconvenient and the sauce is subjected to too much mechanical work, which could lead to damage of the starch molecules.

The invention also relates to frozen pellets of sauce made by the methods described above. Additionally the invention relates to non-molded and extruded frozen pellets of sauce which when thawed have a viscosity which is substantially the same as non-frozen sauce.

When mixing the frozen and unfrozen sauce, it is generally useful for about 10 to 40% by weight of the sauce to not be solidified, i.e., about 60 to 90% by weight of the sauce is frozen. The ratio of frozen to unfrozen sauce depends somewhat on the ingredients in the sauce. Typically, between about 20 to 30% unfrozen sauce and 70 to 80% frozen sauce are used. For any particular sauce formulation, a person having ordinary skill in the art can conduct routine tests to determine the optimum amounts of frozen and unfrozen sauce that should be combined.

The invention is illustrated schematically in FIG. 1, where sauce is dosed from a supply onto a surface of freezer in a layer. The sauce is partly frozen on the surface to cause a generation of ice crystals at the lower and upper surface of the layer and to increase in the viscosity of the unfrozen sauce. The partially frozen sauce is then removed from the surface and broken up and mixed in a mixer. In this mixer, additional unfrozen sauce may be supplied from the sauce supply and additional food product particles may be added at. The sauce and the ingredients form a shapeable sauce mass. The shapeable sauce mass is formed by shaping means in, e.g., by extruding the mass through a die and cutting it into the final size pellets or portions. The pellets or portions are then passed onto after-freezing in a freezer 5 of conventional type, e.g., a belt freezer, spiral freezer or fluid bed freezer, etc.

EXAMPLE

The following sauces were tested: cheese sauce, Béchamel sauce, tomato sauce with pieces of tomato, and Bolognese sauce.

Béchamel sauce was prepared from the following ingredients: Starch, dried egg white, milk powder, cheese and/or vegetable oil, and water. It consisted of (given in weight of the total Béchamel sauce):

7–11% cold water soluble starch,

14–18% egg white powder, about 3% milk powder, about 30% vegetable oil, and 58 to 62% water. Water is added in an amount sufficient to make the Béchamel sauce pumpable.

Sauce at a temperature of approximately 4° C. was dosed in bands onto a plastic film on a plate-contact freezer. The dosing was performed by a pump. The thickness was approximately 5 mm. The top and bottom surfaces of the sauce were frozen while the center was still liquid. The band of partly frozen sauce was then fed into an auger and gently broken up and mixed into a shapeable sauce mass. The temperature of the shapeable sauce is approximately −5° C. The shapeable sauce was extruded through a die and cut into portions, and the portions frozen in a conventional freezing tunnel at −18° C.

The frozen portions of sauce were re-heated. It was not possible to detect any change in the viscosity of sauce compared with a sauce which had not been subjected to the freezing and shaping process. Neither were any changes in color or texture detectable from the reheated sauce.

What is claimed is:

1. A method for freezing pellets of sauce, comprising the steps of:

dosing a layer of sauce onto a surface, partially freezing the sauce on the surface to cause a generation of ice crystals and an increase in the viscosity of the unfrozen sauce, removing the partially frozen sauce from the surface, mixing the partially frozen sauce to form a shapeable sauce, forming said shapeable sauce into pellets, and freezing the pellets.

2. A method according to claim 1, wherein the sauce layer dosed onto the surface is frozen on one side while the center of the layer remains unfrozen.

3. A method according to claim 2, wherein the sauce is frozen on an upper surface.

4. A method according to claim 3, wherein the sauce layer is frozen on all outer surfaces to form a frozen crust.

5. A method according to claim 1, wherein unfrozen sauce is added to the partially frozen sauce before the mixing step.

6. A method according to claim 5 which further comprises further cooling the frozen and unfrozen sauce during the mixing step.

7. A method according to claim 1, wherein additional ingredients are added before the mixing step.

8. A method according to claim 1, wherein the forming step comprises extruding the shapeable sauce and portioning the extrudate into pellets.

9. A method according to claim 1, wherein the surface has a temperature in the range of about −20° C. to −40° C. to cause the partial freezing of the sauce.

10. A method according to claim 1, wherein the shapeable sauce has a temperature of −2° C. to −8° C.

11. A method according to claim 1, wherein the surface comprises a plastic sheet onto which the sauce is dosed.

12. A method according to claim 1, wherein the mixing is done by an auger.

13. A method according to claim 1, wherein the layer of sauce is partially frozen by contact with refrigerated air.

14. A method according to claim 1, wherein about 10 to 40% by weight of the sauce is not frozen and is mixed with bout 60 to 90% by weight of frozen sauce.

15. Frozen pellets of sauce made by a method according to claim 1.

16. A method according to claim 1, wherein unfrozen sauce is added to the partially frozen sauce during the mixing step.

17. The method of claim 16 which further comprises cooling the frozen and unfrozen sauce during the mixing step.

18. A method according to claim 1, wherein additional ingredients are added during the mixing step.

19. A method according to claim 1, wherein additional ingredients are added after the mixing step.

20. A method for freezing pellets of sauce comprising the steps of:

dosing a layer of sauce onto a freezing surface, freezing the sauce on the surface to cause a crystallization of ice crystals, removing the frozen sauce from the surface, adding unfrozen sauce to the frozen sauce and mixing the unfrozen and frozen sauce to form a shapeable sauce, forming said shapeable sauce into pellets, and freezing the pellets.

21. A method according to claim 20, wherein about 60 to 90% by weight of frozen sauce is mixed with about 10 to 40% by weight of unfrozen sauce.

22. Frozen pellets of sauce made by a method according to claim 20.

* * * * *